United States Patent
Eizman

(10) Patent No.: US 10,692,398 B2
(45) Date of Patent: Jun. 23, 2020

(54) THREE-DIMENSIONAL DYNAMIC APPARATUS AND METHOD OF USE

(71) Applicant: Galit Eizman, Brookline, MA (US)

(72) Inventor: Galit Eizman, Brookline, MA (US)

( * ) Notice: Subject to any disclaimer, the term of this patent is extended or adjusted under 35 U.S.C. 154(b) by 302 days.

(21) Appl. No.: 15/870,301

(22) Filed: Jan. 12, 2018

(65) Prior Publication Data

US 2018/0204483 A1 Jul. 19, 2018

Related U.S. Application Data

(60) Provisional application No. 62/445,766, filed on Jan. 13, 2017.

(51) Int. Cl.
| | | |
|---|---|---|
| *G09B 19/00* | (2006.01) | |
| *G09B 19/18* | (2006.01) | |
| *G09B 23/02* | (2006.01) | |
| *G09B 19/02* | (2006.01) | |
| *G09B 1/00* | (2006.01) | |

(52) U.S. Cl.
CPC ............ *G09B 19/18* (2013.01); *G09B 1/00* (2013.01); *G09B 19/00* (2013.01); *G09B 19/02* (2013.01); *G09B 23/02* (2013.01)

(58) Field of Classification Search
None
See application file for complete search history.

(56) References Cited

U.S. PATENT DOCUMENTS

| | | | | |
|---|---|---|---|---|
| 3,571,948 A * | 3/1971 | Heffernan | ............. | G09B 19/18 434/107 |
| 9,011,159 B2 * | 4/2015 | Tazerout | ............... | G09B 23/40 434/107 |

* cited by examiner

*Primary Examiner* — Paul A D'Agostino
(74) *Attorney, Agent, or Firm* — Law Offices of Daniel A. Tesler, LLC

(57) ABSTRACT

Disclosed in this application is a three-dimensional dynamic apparatus that can be configured for illustrating mathematical correlation as in the field of Economics. The three-dimensional dynamic apparatus is comprised of a grid panel with side panels defining one or more three-dimensional spaces for lines to be placed as a three-dimensional dynamic representation of the desired subject matter.

11 Claims, 6 Drawing Sheets though the exemplary embodiment of the present invention is directed towards providing a three-dimensional dynamic representation of concepts in the field of Economics, adapting the present invention for use in other subjects would be within the inventive concept expressed herein. The structure

THREE-DIMENSIONAL DYNAMIC APPARATUS AND METHOD OF USE

CROSS REFERENCE TO RELATED APPLICATIONS

This application claims the benefit of U.S. Provisional Patent Application No. 62/445,766 filed Jan. 13, 2017, which is hereby incorporated by reference in its entirety.

FIELD OF THE INVENTION

The present invention relates to dynamic apparatuses used to provide a three-dimensional visualization and, in some examples, to a three-dimensional dynamic apparatus configured for physically modeling concepts in any subject which requires graphing and curving, especially subjects as mathematics and economics.

BACKGROUND OF THE INVENTION

Theoretical concepts, in many subjects or fields of study, are challenging to explain, due to their complexity or theoretical nature. Two-dimensional representations, including graphs and figures, help to explain these challenging concepts. However, some people respond best to visual or physical teaching methods, making it particularly necessary to present material that lends itself to three-dimensional dynamic representations. Therefore, there is a need for three-dimensional dynamic apparatuses that provide a physical and touchable model or three-dimensional dynamic illustrative representation of theoretical concepts, represented by graphs and curves.

While there is a need in all subjects or fields of study for three-dimensional dynamic teaching apparatuses, the subject of Economics is the focus of the exemplary embodiment presented. The subject of Economics includes many concepts that are difficult to present only the two-dimensional manner provided in the prior art. In particular, it can be challenging for students to understand how curves representing supply, demand, utility, costs and profit, as examples, move when a price of an input, income or any other exogenous variable is changed. While three-dimensional dynamic teaching apparatuses already exist in some other fields of study, such as biology, chemistry and physics, there is an absence of three-dimensional physical representations in the subject of Economics. Rather, the subject as Economics presently only uses two-dimensional graphs or charts to illustrate theoretical concepts.

Therefore, there is a need for a three-dimensional dynamic apparatus capable of providing a movable, touchable and physical model of the curves used in Economics and their behavior when the price of an input, income or any other exogenous variable is changed. There is also a need for a method of using the aforementioned apparatus.

BRIEF SUMMARY OF THE INVENTION

The present invention is a three-dimensional dynamic apparatus for providing a physical, touchable and visual model of concepts in Economics and a method of use. While the exemplary embodiment of the present invention is directed towards providing a three-dimensional dynamic representation of concepts in the field of Economics, adapting the present invention for use in other subjects would be within the inventive concept expressed herein. The structure of the apparatus disclosed herein is also well suited for use in mathematics where the curves disclosed could represent lines or equations.

As used herein, the term "physical" includes existence in a three-dimensional state or on an electronic display in a three-dimensional rendering. A three-dimensional rendering on an electronic display can include, but is not limited to, orthogonal, isometric and perspective views or any variation thereof. As used herein, the term "touchable" includes being capable of touch in the physical sense as well as capable of being manipulated on an electronic device or display. Methods of touching a rendering on an electronic device or display include, but are not limited to, using a mouse, keyboard or other input device.

The present invention can also be used in fields outside of education. The structure could be used or adapted for use in games or artistic expressions within the inventive concept expressed herein. In some embodiments, the present invention serves any representation of correlation between two or more possible variables.

DETAILED DESCRIPTION OF THE INVENTION

Figure 1:
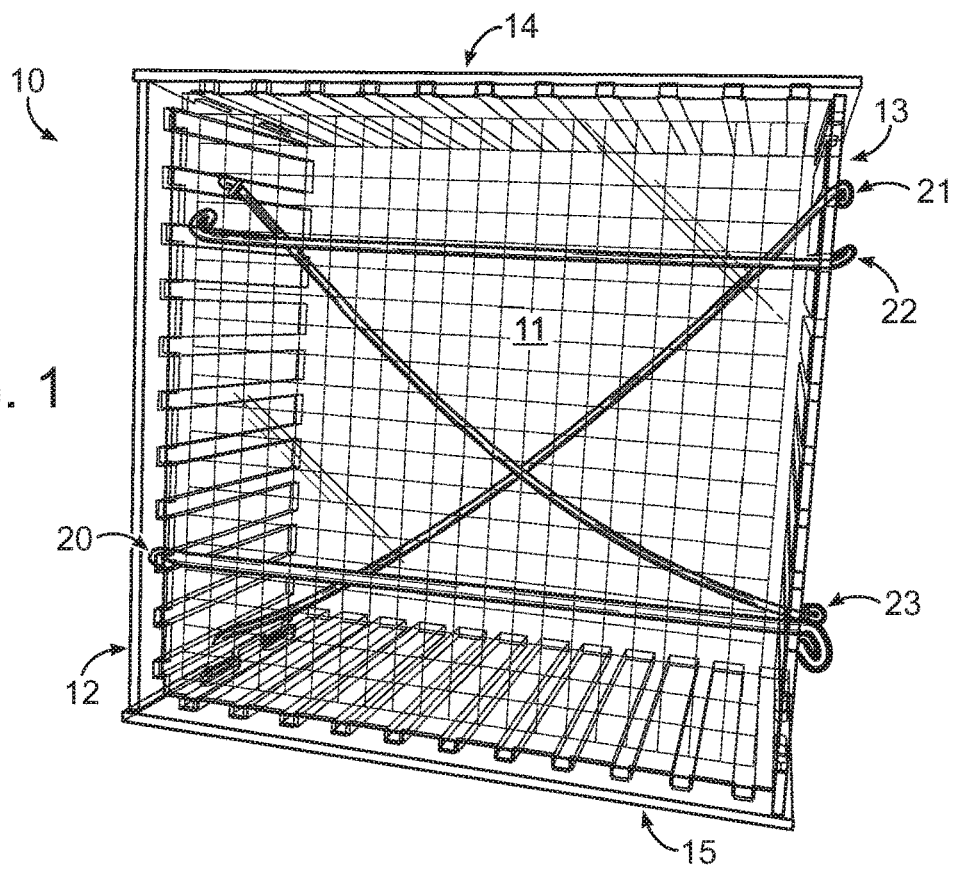
FIG. 1 is a perspective view of the three-dimensional apparatus configured for teaching.
Figure 2:
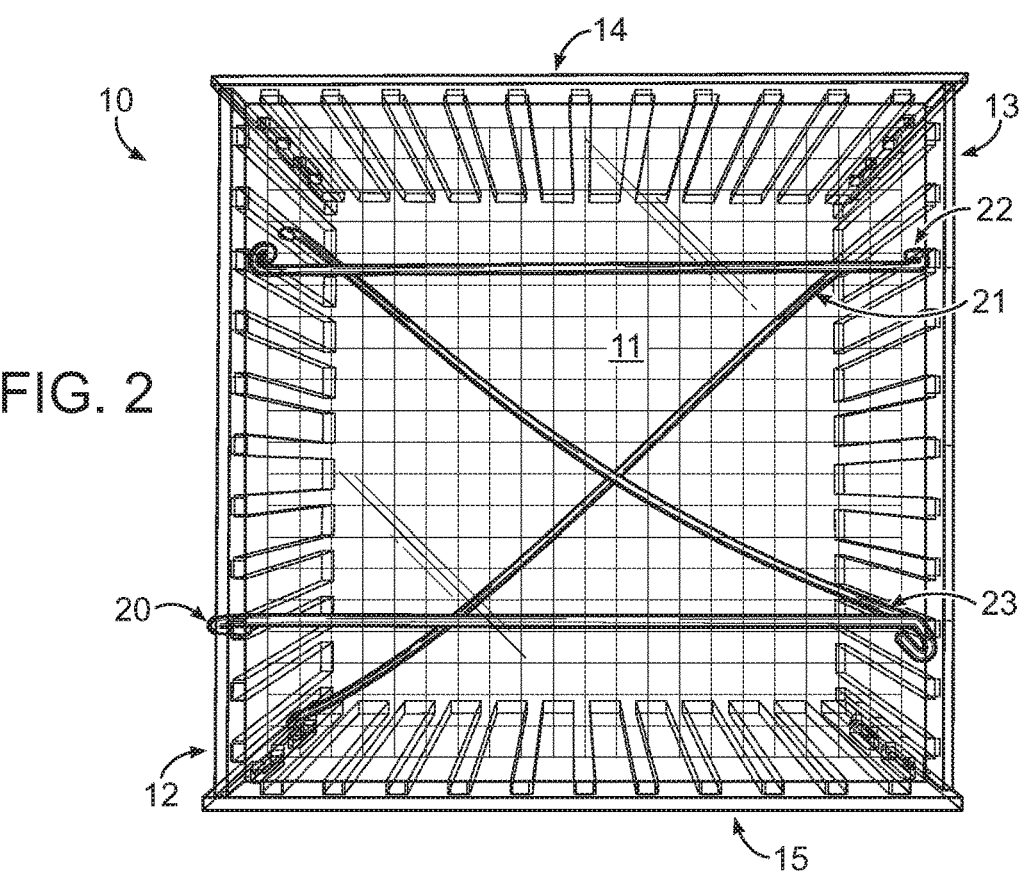
FIG. 2 is a front view of the three-dimensional apparatus configured for teaching.

In FIGS. 1 & 2 is an exemplary embodiment of the three-dimensional dynamic apparatus 10 (hereinafter the "apparatus") of the present invention configured for use in applications including but not limited to teaching, learning and a game. The apparatus 10 can be comprised of a grid panel 11, a left side panel 12, a right side panel 13, a top panel 14, a bottom panel 15 and a plurality of movable lines disposed within one or more spaces defined by the aforementioned panels. In some embodiments, the grid panel 11, left side panel 12, right side panel 13, top panel 14 and bottom panel 15 are transparent or translucent. The left side panel 12, top panel 14, right side panel 13 and bottom panel 15 may be permanently or removably fixed to one another to define an internal space between them. The left side panel 12, top panel 14, right side panel 13 and bottom panel 15 define a cuboid space in the exemplary embodiment, however, internal spaces of difference shapes could be substituted, including but not limited to a cubic space, a cylindrical space, a hexahedron space, etc. The left side panel 12, top panel 14, right side panel 13 and bottom panel 15 may optionally be a single continuous piece of material used to define an internal space. The left side panel 12, top panel 14, right side panel 13 and bottom panel 15 may also be nonplanar or nonorthogonal in some embodiments. In some embodiments, the left side panel 12, top panel 14, right side panel 13 and bottom panel 15 could be described as a tube with a rectangular cross section. In some embodiments, the left side panel 12, top panel 14, right side panel 13 and bottom panel 15 can be a tube with cross-sectional shapes including but not limited to, circular, oval, cubic, quadrilateral, pentagonal, hexagonal, heptagonal, octagonal, etc. In some embodiments, the tube defined by the left side panel 12, top panel 14, right side panel 13 and bottom panel 15 is preferably shorter in the axial direction than in a cross sectional or lateral direction.

While a left side panel 12, top panel 14, right side panel 13 and bottom panel 15 are disclosed in the exemplary embodiment, in some embodiments, the tube defined by the panels may be open in a direction other than the axial direction. When open in a direction other than the axial direction, a panel may be omitted. For example, the top panel could be omitted to make it easier to access the lines within the internal space. It is possible for a single panel to define the internal space if a single panel is folded or curved about the axial center of the internal space.

Within the internal space is a grid panel 11 that may be fixed along its edges to the panels 12-15 or slidably mounted to allow the grid panel 11 to slide in a direction normal to the planes defined by the surfaces of the panels 12-15. In some embodiments, the grid panel 11 is located outside of the internal space in the axial direction from the tube defining the internal space.

Disposed within the internal space are a plurality of movable lines that can vary considerably depending on the particular concept being taught or the type of display sought by a user. In the exemplary embodiment, substantially horizontal lines 20 and 22 and sloping lines 21 and 23 are modeled. In the field of Economics, the sloping line 23 could represent a demand curve and the sloping line 21 could represent a supply curve. The horizontal line 20 could represent a price floor and the horizontal line 22 could represent a price ceiling.

Figure 3:
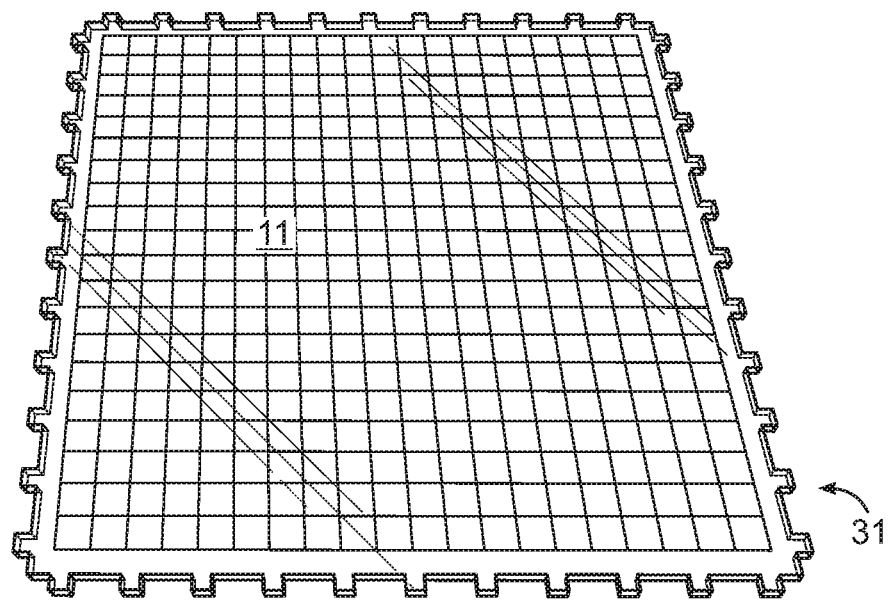
FIG. 3 is a perspective view of the grid panel of the three-dimensional apparatus configured for teaching.
Figure 4:
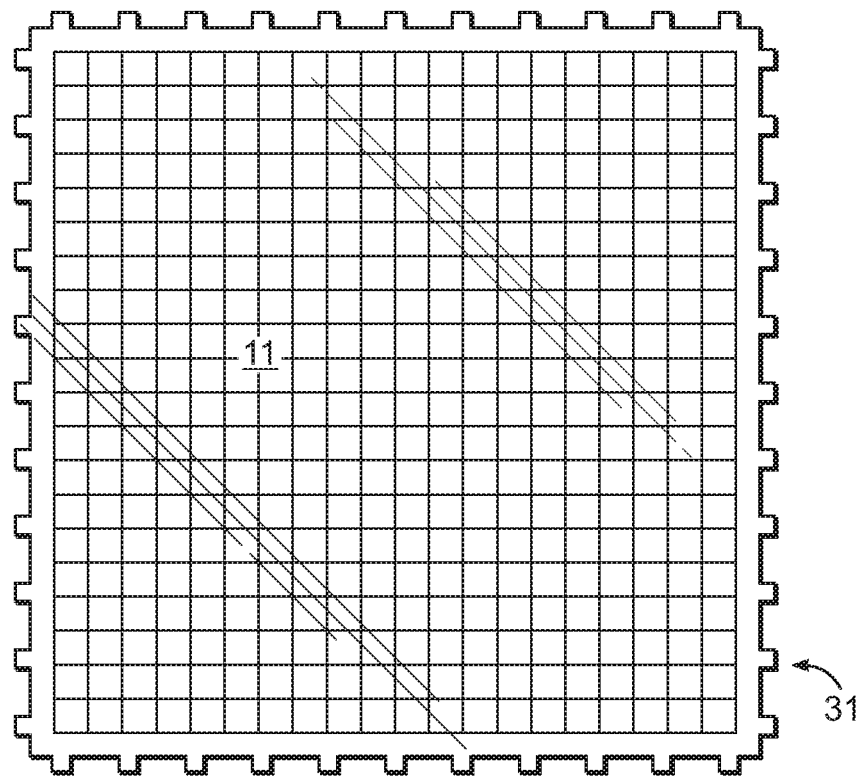
FIG. 4 is a top view of the grid panel of the three-dimensional apparatus configured for teaching.

In FIGS. 3 & 4 are a perspective view and top view of the grid panel 11. The grid panel 11 in the exemplary embodiment has a grid of equally spaced lines engraved or otherwise drawn on one its surfaces or internally within the grid panel 11. In some embodiments, the grid panel 11 does not include a grid of equally spaced lines. When viewed in a direction normal to the grid surface, the grid surface provides an element of scale for the aforementioned lines. The grid panel 11 is further comprised of protrusions 31 that extend laterally from its edge at substantially equal intervals. While the exemplary embodiment uses protrusions 31 that are substantially equally sized and spaced, they could also be of varied size and spacing to create a grid panel that could only be installed in a single orientation.

Figure 5:
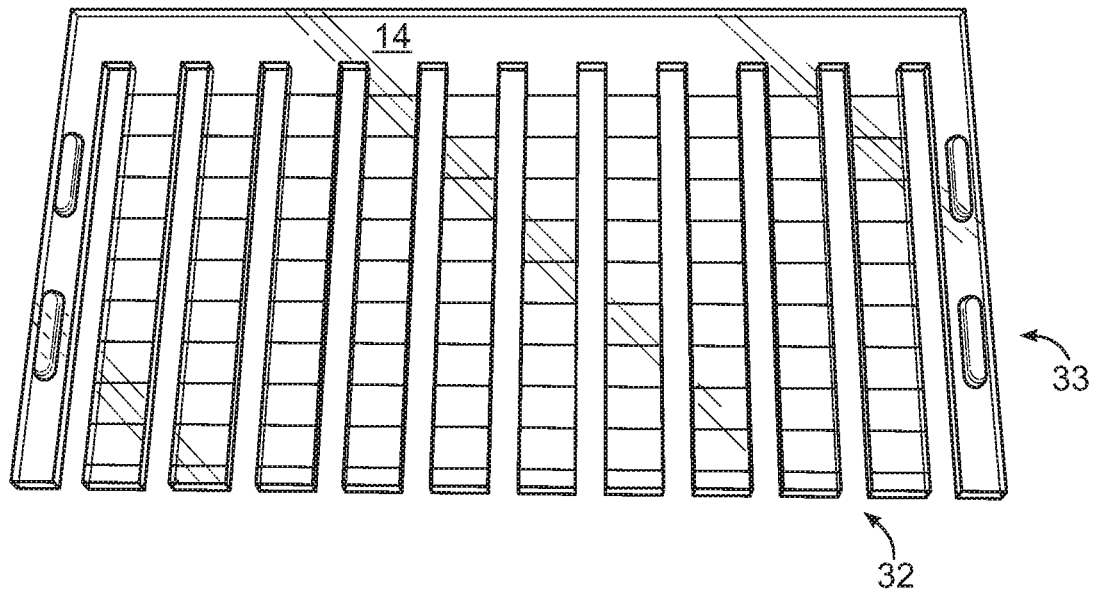
FIG. 5 is a perspective view of the top panel of the three-dimensional apparatus configured for teaching.

In FIG. 5 is a perspective view of the top panel 14, further comprising mounting slots 33 and elongate slots 32. In some embodiments, the bottom panel 15 is substantially the same as the top panel 14. The mounting slots 33 are configured to accept the tabs 34 that extend laterally from the left and right side panels 12 & 13. The elongate slots 32 are configured to accept the protrusions 31 of the grid panel 11. In embodiments where the grid panel 11 is capable of sliding along the elongate slots 32, the elongate slots must be at least wider than the protrusions 31 of the grid panel to prevent interference. In embodiments where the grid panel is not capable of sliding along the elongate slots 32, the elongate slots may be substantially the same as the protrusions 31 to fix the grid panel using friction. In the exemplary embodiment, the elongate slots 32 are substantially the same width and spaced in intervals that correspond to the spacing of the protrusions 31. In other embodiments, the width and spacing of the elongate slots 32 may be varied to require the grid panel to be installed in a particular orientation.

Figure 6:
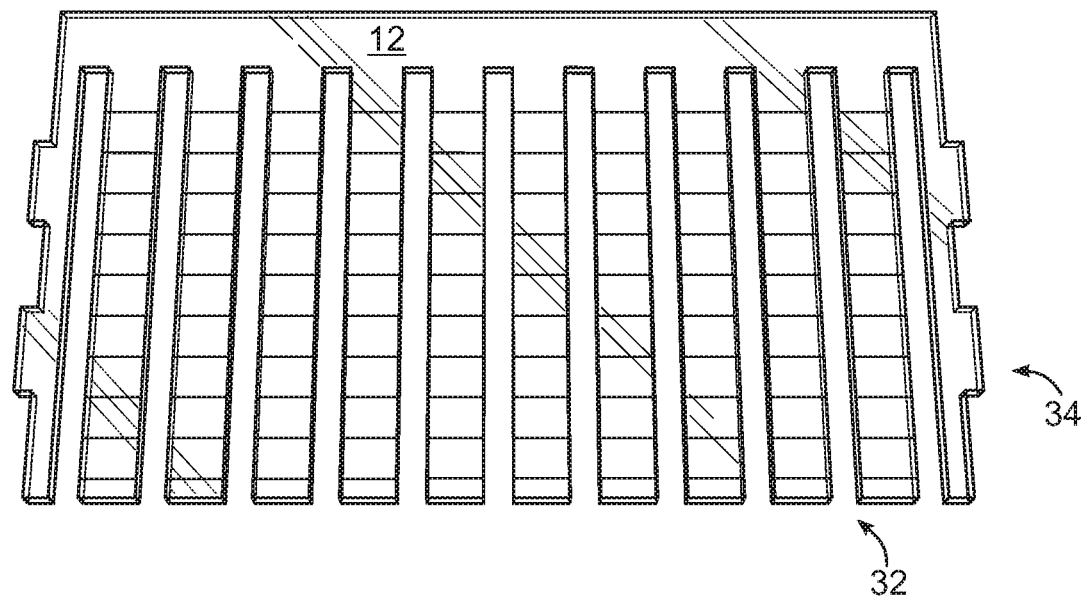
FIG. 6 is a perspective view of the left side panel of the three-dimensional apparatus configured for teaching.

In FIG. 6 is a perspective view of a left side panel 12, further comprising mounting tabs 34 and elongate slots 32. In some embodiments, the right panel 13 is substantially the same as the left side panel 12. The mounting tabs 34 are configured to fit into the mounting slots 33 in the top and bottom panels 14 & 15. In embodiments where the grid panel 11 is capable of sliding along the elongate slots 32 of the side panels 12 & 13, the elongate slots must be at least wider than the protrusions 31 of the grid panel to prevent interference. In embodiments where the grid panel is not capable of sliding along the elongate slots 32 of the side panels 12 & 13, the elongate slots may be substantially the same as the protrusions 31 to fix the grid panel using friction. In the exemplary embodiment, the elongate slots 32 are substantially the same width and spaced in intervals that correspond to the spacing of the protrusions 31. In other embodiments, the width and spacing of the elongate slots 32 may be varied to require the grid panel to be installed in a particular orientation.

In some embodiments, the grid panel 11 may be disposed along one end of the elongate slots 32 or at a distal end. The grid panel 11 may also be disposed at a point between one end of the elongate slots 32 and a distal end so that portions of the elongate slots 32 remain on both sides of the grid panel 11. In some embodiments, the top panel and bottom panels 14 & 15 are used as the side panels and the left and right side panels 12 & 13 are used as the top and bottom panels. It is appreciated that the configuration of mounting tabs 34 and mounting slots 33 may be adjusted, moved between panels or eliminated altogether in favor of a different fastening mechanism. In some embodiments, the mounting tabs 34 and mounting slots 33 are configured to allow the panels 12-15 to be assembled in only one configuration.

Figure 7:
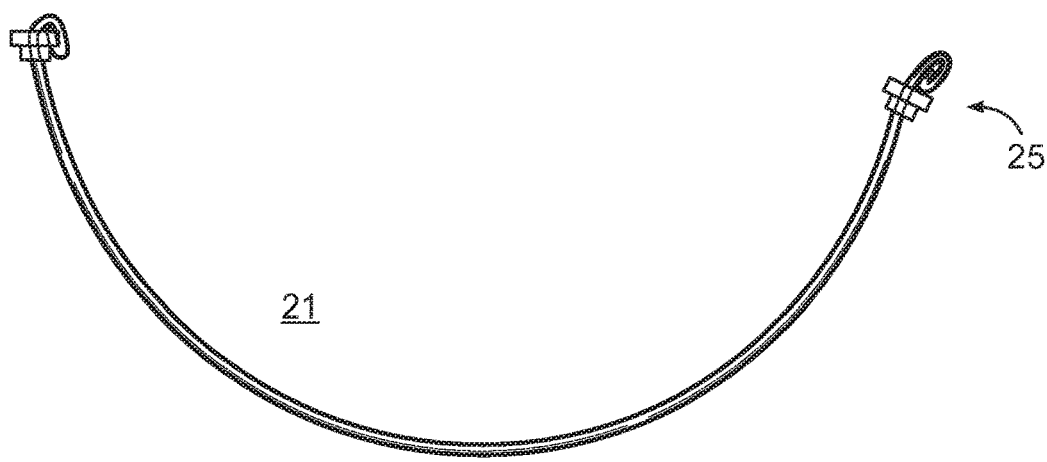
FIG. 7 is a perspective view of a first exemplary embodiment of a movable line used in the three-dimensional apparatus configured for teaching.
Figure 8:
FIG. 8 is a perspective view of a second exemplary embodiment of a movable line used in the three-dimensional apparatus configured for teaching.
Figure 9:
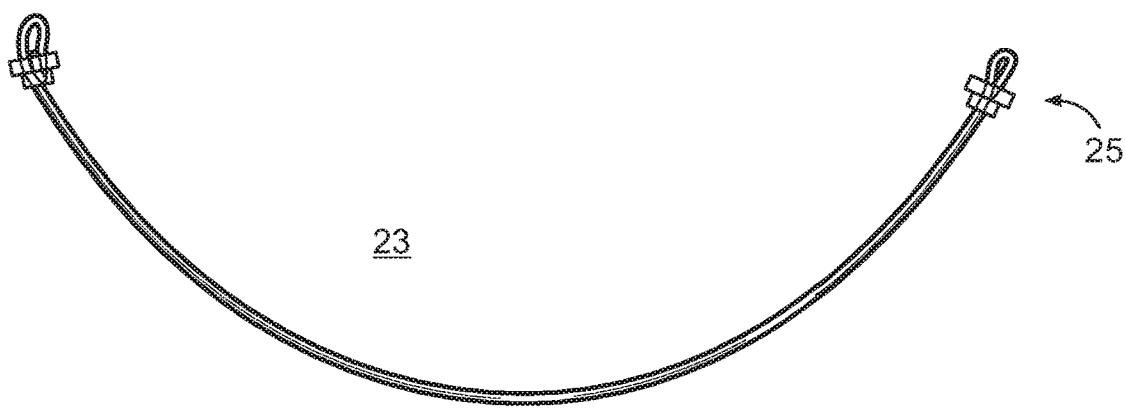
FIG. 9 is a perspective view of a third exemplary embodiment of a movable line used in in the three-dimensional apparatus configured for teaching.

In FIGS. 7-11 are various exemplary embodiments of movable lines that can be used with the apparatus 10. In FIG. 7 is a first exemplary embodiment of a line 21 with a retaining portion 25 fixed to either end. The retaining portion 25 can be configured so that a portion fits within an elongate slot 32 and a portion is wider than the elongate slot 32. When the curved line 21 is placed on the apparatus 10, the line is disposed in the space defined by the panels 12-15, a portion of the retaining portion 25 is within an elongate slot 32 and the wider portion of the retaining portion 25 is disposed outside of the space defined by the panels 12-15. In FIG. 8 is a second exemplary embodiment of a line 22 with a retaining portion 25 fixed to either end. In FIG. 9 is a third exemplary embodiment of a line 23 with a retaining portion 25 fixed to either end.

Figure 10:
FIG. 10 is a perspective view of a fourth exemplary embodiment of a movable line used in the three-dimensional apparatus configured for teaching.
Figure 11:
FIG. 11 is a perspective view of a fifth exemplary embodiment of a movable line used in in the three-dimensional apparatus configured for teaching.

In FIG. 10 is a fourth exemplary embodiment of a line 24 that does not use a retaining portion 25. Instead, the line 24 is further comprised of a portion where the material is manipulated to create a wider area at its ends. The line 24 can slide along the elongate slots 32, but the wider ends cannot easily pass through. In use, the line 24 is largely disposed within the space defined by the panels 12-15 and the wider ends are disposed outside of that space. In FIG. 11 is a fifth exemplary embodiment of a line 20 that similarly uses a wider portion at its ends. In some embodiments, the lines 20-24 can be fixed on one end and removably attached on a second end.

While the exemplary embodiments of the lines 20-24 are comprised of metallic wire with a retaining portion 25 or wider portion at its ends, there are many other types of materials and structures that can be used as lines. Other materials that would be suitable for use in the present invention, include but are not limited to, a string of fixed or variable length, any other flexible material of fixed or variable length or a rigid material of fixed or variable length.

In some embodiments, the apparatus 10 is constructed on an electronic device so that a similar structure is rendered on an electronic display, providing a physical and touchable model. When constructed on an electronic device, the component parts of the apparatus 10 may be modified or simplified to aid in the software design. For instance, the thickness of lines and panels may be adjusted in an electronic version of the apparatus 10 without changing the inventive concept.

The apparatus 10 disclosed herein may be used in a method of teaching Economics that includes first placing one or more lines 20-24 between elongate slots 32 so that the line or lines are largely disposed within the space defined by the sides 12-15. The method of teaching Economics disclosed herein can be directed to the apparatus 10 as disclosed in FIGS. 1-11 or to an electronic rendering of the same. The lines 20-24 may represent one or more curves or variables in an Economics problem or lesson, including but not limited to a supply curve, demand curve, price floor or price cap. While a few exemplary curves used in the field of Economics have been disclosed, the apparatus 10 is capable of demonstrating almost every curve used in Macroeconomics and Microeconomics, Math and other subjects which describe a correlation between two or more variables. When multiple lines 20-24 are placed on the apparatus 10, the relationship between each can be easily understood by a user and equilibrium positions can be quickly identified.

The elongate slots 32 are longer in a direction normal to the surface of the grid panel 11 than the thickness of a single line 20-24 for the added benefit of a three-dimensional representation. The space defined by the panels 12-15 allows the lines to be spaced apart in a direction normal to the surface of the grid panel 11 so that the relationship between the lines can be analyzed by viewing them from a direction substantially normal to the surface of the grid panel 11 or from an offset direction. Viewing the lines 20-24 from an offset direction can help some students understand the relationship between the lines 20-24 and the concepts that they represent.

The apparatus 10 may also be used in a method that shows the change in equilibrium values when the price of an input, income or any other exogenous variable is changed. For instance, a supply curve could be removed from the elongate slots 32 and moved to a different position to represent a shift in that curve. In general, when changing one variable and holding all others constant, the equilibrium position moves along the curve. The new equilibrium position using the new curve would be quickly apparent to a student. When moving a curve, such as the supply curve, the old curve may simply be left and a new supply curve may be placed on the apparatus 10 to allow a student to see the new and old supply curves. By being able to see both the new and old curves, a student would quickly be able to identify how an equilibrium position changed.

In some methods of use, a person may write on the apparatus 10 to identify particular locations or to give the grid panel 11, left side panel 12, right side panel 13, top panel 14 or bottom panel 15 scale. When the aforementioned panels are either transparent or translucent, the writing would be capable of being seen from multiple angles. The apparatus 10 may be used without units for scale on the aforementioned panels to teach or learn general concepts or may be used with units to teach or learn a particular problem. The units for scale may be written with erasable markers or engraved/printed permanently on the aforementioned panels.

In one embodiment, the grid panel 11 can be located between one end of the elongate slots 32 and its distal end so that lines may be placed in the elongate slots 32 on either side of the grid panel 11. It could be beneficial to place lines 20-24 on either side of the grid panel 11 to show a first market condition on one side and a second market condition on a second side.

Figure 12:
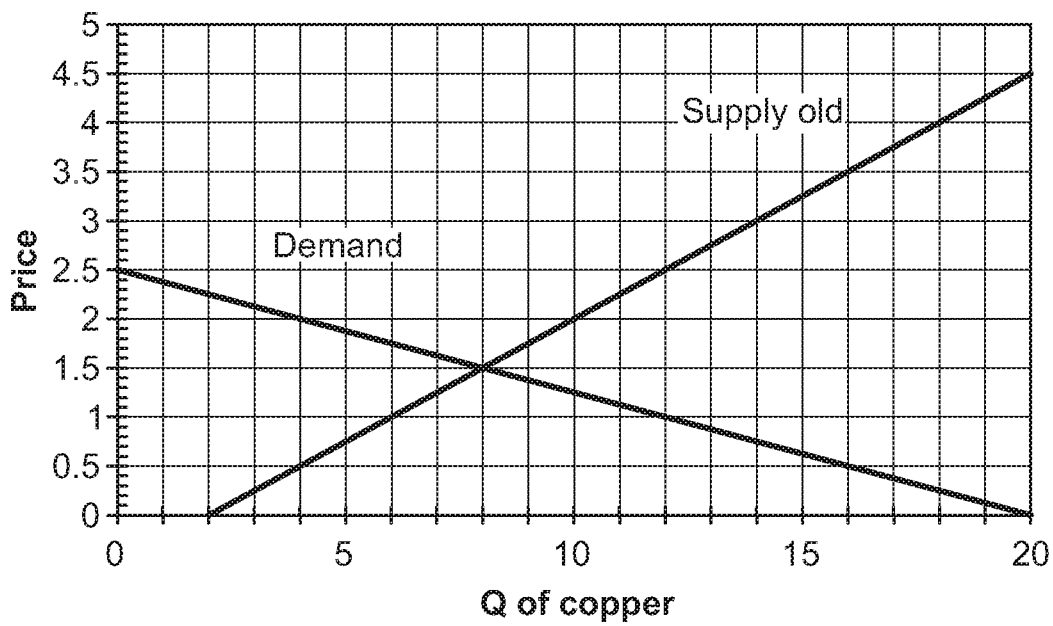
FIG. 12 is a first example of a prior art two-dimensional representation used in the field of Economics.
Figure 13:
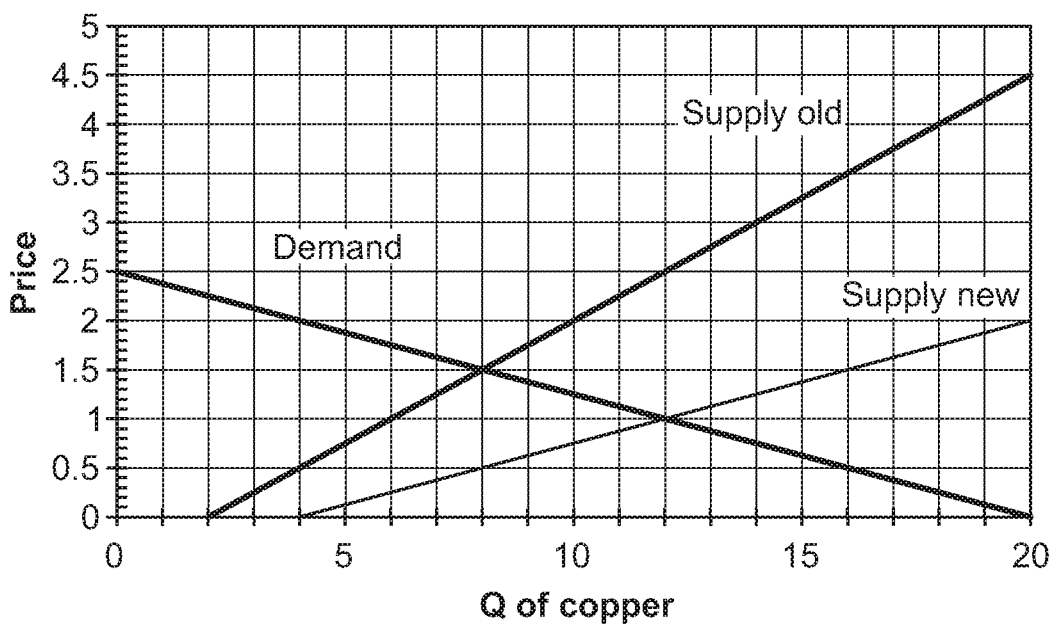
FIG. 13 is a second example of a prior art two-dimensional representation used in the field of Economics.

In FIGS. 12 & 13 are examples of two-dimensional, static graphs used in the prior art to solve an Economics problem. The apparatus 10 is capable of providing a three-dimensional and dynamic model of the theoretical concepts that can enhance a student's ability to learn them. The apparatus 10 can allow a student to physically move a curve to represent an exogeneous shift in a curve, helping to reinforce how shifts impact the equilibrium point and why the shift occurs.

What has been described is an apparatus and method of use configured, as an example, for teaching or learning the subject of Economics. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A three-dimensional apparatus, comprising:
a bottom panel attached to a left side panel and a right side panel;
wherein the bottom panel, left side panel and right side panel define an internal space;
wherein the internal space is open in a direction parallel to the bottom panel;
a vertical panel at least partially disposed in the internal space; and
a first movable elongate member configured to be attached on its proximate end to one of the bottom panel, left side panel or right side panel and configured to be attached on its distal end to one of the bottom panel, left side panel and right side panel.

2. The three-dimensional apparatus of claim 1, further comprising a top panel attached to the left side panel and the right side panel.

3. The three-dimensional apparatus of claim 2, wherein the vertical panel is slidably disposed within the internal space and configured to allow movement in a direction substantially parallel to the bottom panel.

4. The three-dimensional apparatus of claim 2, wherein the vertical panel is fixed to the bottom panel.

5. The three-dimensional apparatus of claim 3, wherein:
the left side panel further comprises a plurality of slots open in a lateral direction; and
the right side panels further comprises a plurality of slots open in a lateral direction.

6. The three-dimensional apparatus of claim 5, wherein the first movable elongate member further comprises a first retaining portion fixed to the proximate end of the first movable elongate member.

7. The three-dimensional apparatus of claim 6, wherein:
the first retaining portion further comprises a first end fixed to the first elongate member and a second end;
wherein the first end has a dimension less than the height of the slots on the right panel and the left panel; and
wherein the second end has a dimension greater than the height of the slots on the right panel and the left panel.

8. The three-dimensional apparatus of claim 7, wherein:
the first movable elongate member further comprises a second retaining portion fixed to the distal end of the first movable elongate member;
the second retaining portion further comprises a first end fixed to the distal end of the first elongate member and a second end;
wherein the first end of the second retaining portion has a dimension less than the height of the slots on the right panel and the left panel; and
wherein the second end of the second retaining portion has a dimension greater than the height of the slots on the right panel and the left panel.

9. The three-dimensional apparatus of claim 8, wherein the first retaining portion and second retaining portion are configured to slide along the slots in the right panel and the left panel.

10. The three-dimensional apparatus of claim 5, wherein:
the vertical panel further comprises protrusions on a first edge configured to slide in the slots in the left side panel;
the vertical panel further comprises protrusions on a second edge configured to slide in the slots in the right side panel; and
wherein the second edge is opposite the first edge on the vertical panel.

11. The three-dimensional apparatus of claim 10, wherein:
the top panel further comprises a plurality of slots open vertically;
the bottom panel further comprises a plurality of slots open vertically;
the vertical panel further comprises protrusions on a third edge configured to slide in the slots in the top panel;
the vertical panel further comprises protrusions on a fourth edge configured to slide in the slots in the bottom panel; and
wherein the fourth edge is opposite the third edge on the vertical panel.

* * * * *